(12) United States Patent
Prabhu et al.

(10) Patent No.: US 7,408,582 B2
(45) Date of Patent: Aug. 5, 2008

(54) METHODS FOR CONFIGURING A DIGITAL CAMERA AND FOR DISPLAY DIGITAL IMAGES

(75) Inventors: Girish V. Prabhu, Fairport, NY (US);
Michael E. Miller, Rochester, NY (US);
Su Y. Akyuz, San Jose, CA (US); John L. Wasula, Rochester, NY (US);
Anthony L. Tintera, Hamlin, NY (US);
Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 876 days.

(21) Appl. No.: 10/850,145

(22) Filed: May 20, 2004

(65) Prior Publication Data
US 2004/0212700 A1 Oct. 28, 2004

Related U.S. Application Data

(63) Continuation of application No. 09/549,356, filed on Apr. 14, 2000, now Pat. No. 7,019,778.

(60) Provisional application No. 60/137,094, filed on Jun. 2, 1999.

(51) Int. Cl.
*H04N 5/222* (2006.01)
*H04N 5/225* (2006.01)
(52) U.S. Cl. .............. 348/333.05; 348/333.01; 348/207.1
(58) Field of Classification Search .......... 348/207.1, 348/207.11, 231.1–231.9, 333.01, 333.02, 348/333.05
See application file for complete search history.

(56) References Cited

U.S. PATENT DOCUMENTS 4,642,678 A 2/1987 Cok
4,774,574 A 9/1988 Daly et al.

(Continued)

FOREIGN PATENT DOCUMENTS

EP 0552543 7/1993
EP 0998140 A1 3/1998

OTHER PUBLICATIONS

PC Card Standard, Release 2.0 published by the Personal Computer Memory Card International Association, Sunnyvale, California, Sep. 1991.

(Continued)

*Primary Examiner*—Lin Ye
*Assistant Examiner*—Kelly Jerabek
(74) *Attorney, Agent, or Firm*—Pamela R. Crocker

(57) ABSTRACT

A method for customizing a digital camera for at least one particular user is disclosed. The digital camera includes a reprogrammable memory for storing firmware which controls the operation of the digital camera and a camera graphical user interface responsive to the firmware stored in the reprogrammable memory. The method includes providing customization software executed external to the digital camera which can access a plurality of firmware components having different camera features. A user selects desired camera features to cause the customization software to access the corresponding firmware component(s). The selected corresponding firmware component(s) are provided to the digital camera and the reprogrammable memory is reprogrammed to store the corresponding firmware component(s) to thereby customize the digital camera.

19 Claims, 12 Drawing Sheets

U.S. PATENT DOCUMENTS

| | | | |
|---|---|---|---|
| 4,962,419 | A | 10/1990 | Hibbard et al. |
| 5,189,511 | A | 2/1993 | Parulski et al. |
| 5,477,264 | A | 12/1995 | Sarbadhikari et al. |
| 5,493,335 | A | 2/1996 | Parulski et al. |
| 5,541,656 | A * | 7/1996 | Kare et al. ............. 348/333.02 |
| 5,633,678 | A | 5/1997 | Parulski et al. |
| 5,734,425 | A | 3/1998 | Takizawa et al. |
| 5,914,748 | A | 6/1999 | Parulski et al. |
| 6,006,039 | A | 12/1999 | Steinberg et al. |
| 6,104,430 | A * | 8/2000 | Fukuoka ................. 348/231.6 |
| 6,154,210 | A | 11/2000 | Anderson |
| 6,223,190 | B1 | 4/2001 | Aihara et al. |
| 6,275,225 | B1 | 8/2001 | Rangarajan et al. |
| 6,317,141 | B1 | 11/2001 | Pavley et al. |
| 6,362,851 | B1 | 3/2002 | Lavelle et al. |
| 6,507,363 | B1 * | 1/2003 | Anderson et al. ........ 348/231.9 |
| 6,512,919 | B2 | 1/2003 | Ogasawara |
| 6,954,229 | B1 * | 10/2005 | Otala .................... 348/231.99 |
| 2002/0126147 | A1 | 9/2002 | Lavendel et al. |

OTHER PUBLICATIONS

CompactFlash Specification Version 1.3, published by the CompactFlash Association, Palo Alto, California, Aug. 5, 1998.

\* cited by examiner

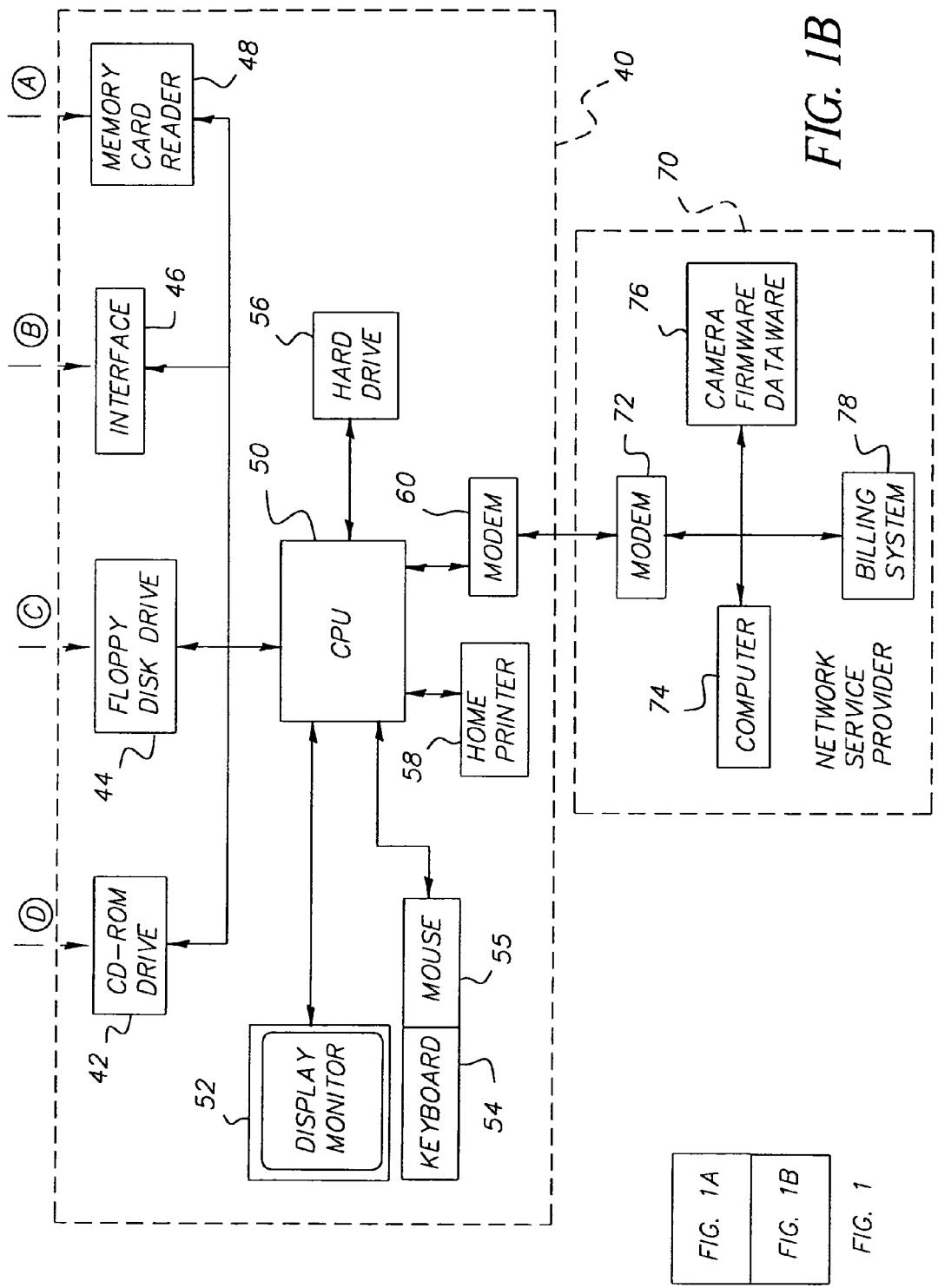

METHODS FOR CONFIGURING A DIGITAL CAMERA AND FOR DISPLAY DIGITAL IMAGES

CROSS REFERENCE TO RELATED APPLICATIONS

This is a continuation of application Ser. No. 09/549,356 filed Apr. 14, 2000, now U.S. Pat. No. 7,019,778 entitled "Method and Apparatus for Providing A User Customizable Digital Camera" by Prabhu et al.; and reference is made to commonly assigned U.S. Provisional Patent Application Ser. No. 60/137,094, filed Jun. 2, 1999, entitled "Method and Apparatus for Customized Automation of Digital Image Transfer" to Wasula et al.; commonly assigned U.S. Ser. No. 09/272,855, filed Mar. 19, 1999, entitled "A Method For Selectively Or Automatically Matching The Characteristics Of A Display To A Language" by Prabhu et al.; commonly assigned U.S. Ser. No. 09/534,469, filed Mar. 24, 2000 entitled "Configuring and Purchasing Imaging Devices" by Parulski; commonly assigned U.S. Ser. No. 09/534,470, filed Mar. 24, 2000 entitled "Purchasing Configured Photographic Film Products" by Parulski; and commonly assigned U.S. Ser. No. 09/534,471, filed Mar. 24, 2000 entitled "Leasing A Configured Camera" by Parulski, the disclosures of which are herein incorporated by reference.

FIELD OF THE INVENTION

This invention relates generally to the field of digital cameras, and in particular, to customizing digital cameras for particular users.

BACKGROUND OF THE INVENTION

Digital cameras, such as the Kodak DC260™ digital camera, sold by the Eastman Kodak Company, enable images to be utilized on a home personal computer (PC), printed locally or remotely, and incorporated into e-mail documents and personal World-Wide-Web home pages which can be accessed via the Internet. The camera's graphic user interface (GUI) enables many different features to be selected, but it is complicated, and thus, very difficult for a first-time user to understand. The camera provides a fixed set of features to the end user. These features can be controlled by Digital Scripts specified by Flashpoint, Inc. Digital Scripts are ASCII text files created with a text editor on a host computer. Such Scripts may be invoked to select particular camera features and to perform a defined sequence of camera operations. For example, a Script may capture an exposure series of still pictures using different exposure settings.

This type of camera design presents several problems, including the fact that any feature that is likely to be demanded by even a small subset of the users must be included in the camera. A consequence of this is that the complexity of digital cameras has increased. This leads to an increase in user anxiety, and therefore, serves as a barrier to market adoption.

The firmware in the DC260™ digital camera, for example, can be replaced via a memory card, as described in commonly-assigned U.S. Pat. No. 5,477,264, entitled "Electronic Imaging System Using A Removable Software-Enhanced Storage Device," the disclosure of which is herein incorporated by reference. Images can be assigned to albums, as described in commonly-assigned U.S. Pat. No. 5,633,678, entitled "Electronic Still Camera For Capturing And Categorizing Images," the disclosure of which is herein incorporated by reference.

Commonly-assigned U.S. Ser. No. 08/977,382, filed Nov. 24, 1997, entitled "Electronic Camera With Utilization Selection Capability," and U.S. Ser. No. 09/004,046, filed Jan. 7, 1998, entitled "Network Configuration File for Automatically Transmitting Images from an Electronic Still Camera" to Ward et al., the disclosures of which are herein incorporated by reference, disclose digital cameras which are provided with host software that enables templates, e-mail addresses, and other information to be selected at the host computer, downloaded to the digital camera, and used, for example, to automatically produce prints and e-mail images. Although this enables user-selected information (such as preferred templates and personalized e-mail addresses) to be downloaded to the digital camera, the actual features of the digital camera normally remain the same for all users who have the same camera model.

SUMMARY OF THE INVENTION

Accordingly, it is an object of the present invention to customize a digital camera to include only the features desired by the user, and to be personalized with user preferences, such as color background, icons, and names.

It is a further object of the present invention to enable a user to easily add or remove the features that the user wants or does not want, respectively, to try new features, to keep only the features that are of interest to the user, and to add a feature to the digital camera after purchase that was not available at the time of purchase. In addition, it is an object of the present invention to enable the customer or retailer to customize the digital camera.

It is yet another object of the present invention to enable a digital camera retailer to offer camera packages, or bundles of software, that meet the needs of specific groups of their well-known clientele, and to sell new firmware components at the point of sale that they believe to be popular.

These objects are achieved by a method for customizing a digital camera for at least one particular user, the digital camera including a reprogrammable memory for storing firmware which controls the operation of the digital camera and a camera graphical user interface responsive to the firmware stored in the reprogrammable memory, the firmware including at least one firmware component, the method comprising the steps of:

(a) providing customization software executed external to the digital camera which can access a plurality of firmware components providing different camera features;

(b) the user selecting desired camera features to cause the customization software to access the corresponding firmware component(s); and (c) providing the selected corresponding firmware component(s) to the digital camera and reprogramming the reprogrammable memory of the digital camera to store the corresponding firmware component(s) to thereby customize the digital camera.

ADVANTAGES

It is an advantage of the present invention for a particular user to customize the look and feel of a digital camera, and the features offered by the digital camera.

It is another advantage of the present invention for a particular user to customize a digital camera to include only those features that are of interest to the user. Therefore, a novice user can customize a digital camera to provide a very simple set of features, and a more advanced user can customize a digital camera to include a more complex set of features.

BRIEF DESCRIPTION OF THE DRAWINGS

FIGS. 1A and 1B, taken together, are a block diagram of a digital imaging system in accordance with the present invention for providing a user customizable digital camera 10;

DETAILED DESCRIPTION OF THE INVENTION

Figure 1A:
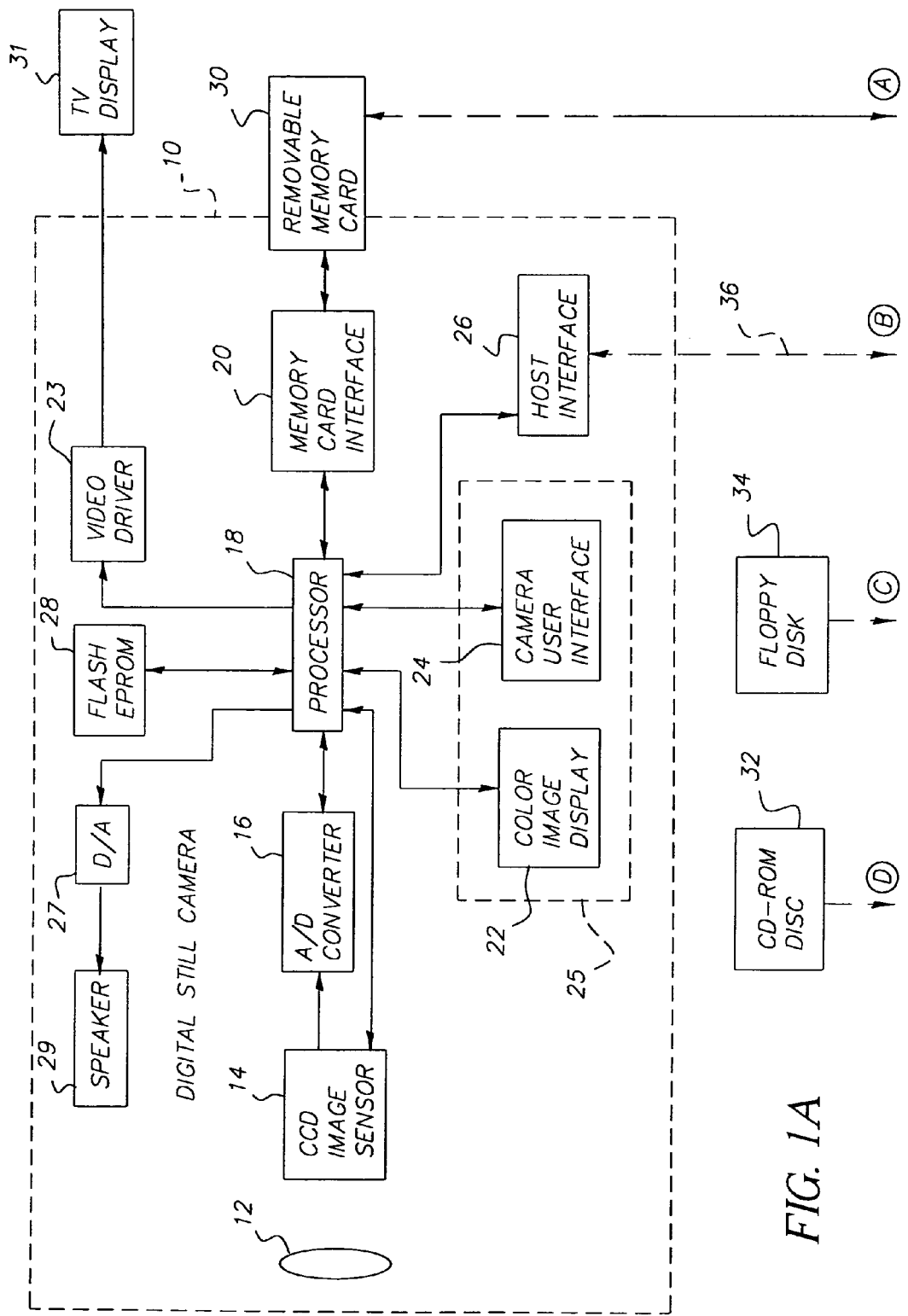

FIG. 1 is a block diagram of a digital imaging system in accordance with the present invention, which enables users to easily customize the interface and features of their digital camera prior to taking pictures. The digital imaging system includes a digital camera 10 which is supplied along with camera customization software provided on a compact disc CD-ROM 32, a floppy disk 34, or other digital media. The digital imaging system also includes a host computer 40, such as a Dell Dimension XPS M200, and a Network Service Provider 70. In accordance with the present invention, camera customization software is executed external to the digital camera 10, and is typically executed on the host computer 40. The camera customization software accesses software code which permits firmware in the digital camera 10 to be customized by a user. The software code can be source code which is compiled by the camera customization software to create executable firmware. Alternatively, the software code can be compiled firmware components or firmware settings which are accessed by the camera customization software. The camera customization software can modify or combine firmware components in order to provide firmware which customizes the digital camera 10. The camera customization software also includes one or more applications that provide a series of interactive dialogues with the user so that the user may learn about available camera features and select features of interest.

The digital camera 10 produces digital images that are stored on a removable memory card 30. The digital camera 10 includes an optical viewfinder 11. (shown in FIG. 4C) for composing a scene (not shown), a 3:1 zoom lens 12 controlled by a zoom switch 13 (shown in FIG. 4C) having telephoto (T) and wide angle (W) positions and having zoom and focus motor drives (not shown), and an adjustable aperture and shutter (not shown) for focusing light from a scene on an image sensor 14. The image sensor 14 can be, for example, a single-chip color charge-coupled device (CCD), using the well-known Bayer color filter pattern. When the user depresses a shutter button 15 (shown in FIG. 4C), the analog output signal from the image sensor 14 is converted to digital data by an analog-to-digital (A/D) converter 16. The digital data is processed by a processor 18 controlled by firmware stored in a reprogrammable memory, such as a Flash EPROM 28.

The processed digital image file is provided to a memory card interface 20 which stores the digital image file on the removable memory card 30 or on another type of digital memory device, such as a floppy disk or magnetic hard drive. The removable memory card 30, which is well-known to those skilled in the art, can include, for example, a memory card adapted to the PCMCIA card interface standard, as described in the PC Card Standard, Release 2.0, published by the Personal Computer Memory Card international Association, Sunnyvale, Calif, Sep. 1991. The removable memory card 30 can also be adapted to the Compact Flash interface standard, such as described in the Compact Flash Specification Version 1.3, published by the Compact Flash Association, Palo Alto, Calif, Aug. 5, 1998, or to other memory devices such as the well-known SSFDC (Solid State Floppy Disc Card) or Memory Stick formats.

The processor 18 performs color interpolation followed by color and tone correction, in order to produce rendered sRGB image data. This processing is described later with reference to FIG. 8. The processor 18 can include internal buffer memory to store a portion of the image, or to store one or more images. Alternatively, the processor 18 can use a separate external memory (not shown), such as DRAM memory. The rendered sRGB image data is then JPEG compressed and stored as a JPEG image file on the removable memory card 30. The processor 18 also provides a lower resolution or "thumbnail" size image data to a color image display 22, such as a color liquid crystal display (LCD), which displays the captured image for the user to review. A camera user interface 24 including a series of user buttons 80, 81, 82, 83, and 84 (shown in FIG. 4C) and a capture/review mode switch 86 (shown in FIG. 4C), is used to control the digital camera 10. The camera user interface 24, together with text and icons displayed on the image display 22 (shown also in FIG. 4C), forms the camera graphical user interface (GUI). This GUI is controlled by the user interface portion of the firmware stored in the Flash EPROM 28. The digital camera 10 can also include a digital-to-analog (D/A) converter 27 and a miniature speaker 29 (also shown in FIG. 4C) which makes audible sounds when a new picture is taken, or when the user changes modes or advances to review the next stored image. The digital camera 10 can also include a video output driver 23 which connects to a TV display 31, such as an NTSC format home television, for displaying the captured images on the TV display 31. The digital camera 10 further includes a strobe flash unit (not shown) for illuminating the subject when the ambient illumination level is low.

After a series of images has been taken by the digital camera 10 and stored on the removable memory card 30, the removable memory card 30 can be inserted into a memory card reader 48 in the host computer 40. Alternatively, an interface cable 36 can be used to connect between a host interface 26 in the digital camera 10 and a camera interface 46 in the host computer 40. The interface cable 36 may conform to, for example, the well-know universal serial bus (USB) interface specification.

The captured images from the digital camera 10 can be downloaded to the host computer 40 and stored on a hard drive 56 under the control of a central processing unit (CPU) 50. The CPU 50 is coupled to a display monitor 52, which is used to view the images, and a keyboard 54. A mouse 55 permits the user to readily communicate with the CPU 50. The CPU 50 communicates with a 25 local printer 58, such as an Epson Stylus Photo 700 printer, which produces hard copy prints of the images captured by the digital camera 10.

The digital camera 10 that is supplied to a user includes firmware stored in the Flash EPROM 28 which provides normal camera features. Users can customize the look and feel, and the functions offered by the digital camera 10, using the camera customization software provided with the digital camera 10. This camera customization software is provided on the CD-ROM disc 32, which is loaded into the host computer 40 via the CD-ROM drive 42, or provided on the floppy disk 34, which is loaded into the host computer 40 via the floppy disk drive 44. The CD-ROM disc 32 or the floppy disk 34 can also include digital image application software, such as the Picture Easy™ version 3.1 software developed by the Eastman Kodak Company. Alternatively, all of the camera customization software could be downloaded from the Network Service Provider 70 via a modem 60. The modem 60 communicates with a modem 72 at the Network Service Provider 70, which is connected to a computer 74, a camera firmware database 76, and a billing system 78 which can charge the user (e.g., via a credit card) for downloading the camera customization software. The CPU 50 uses the camera customization software in accordance with the present invention to provide custom firmware code which is downloaded under the control of processor 18 of the digital camera 10 via the removable memory card 30, and stored in the Flash EPROM 28, as described in commonly-assigned U.S. Pat. No. 5,477,264, entitled "Electronic Imaging System Using a Removable Software-Enhanced Storage Device" to Sarbadhikari et al., or via the interface cable 36 as described in commonly-assigned U.S. Pat. No. 5,734,425, entitled "Electronic Still Camera With Replaceable Digital Processing Program" to Takizawa et al., the disclosures of which are herein incorporated by reference. The process of storing firmware code in an EPROM and of erasing firmware code from an EPROM is well known in the art, and need not be discussed in detail.

Figure 2:
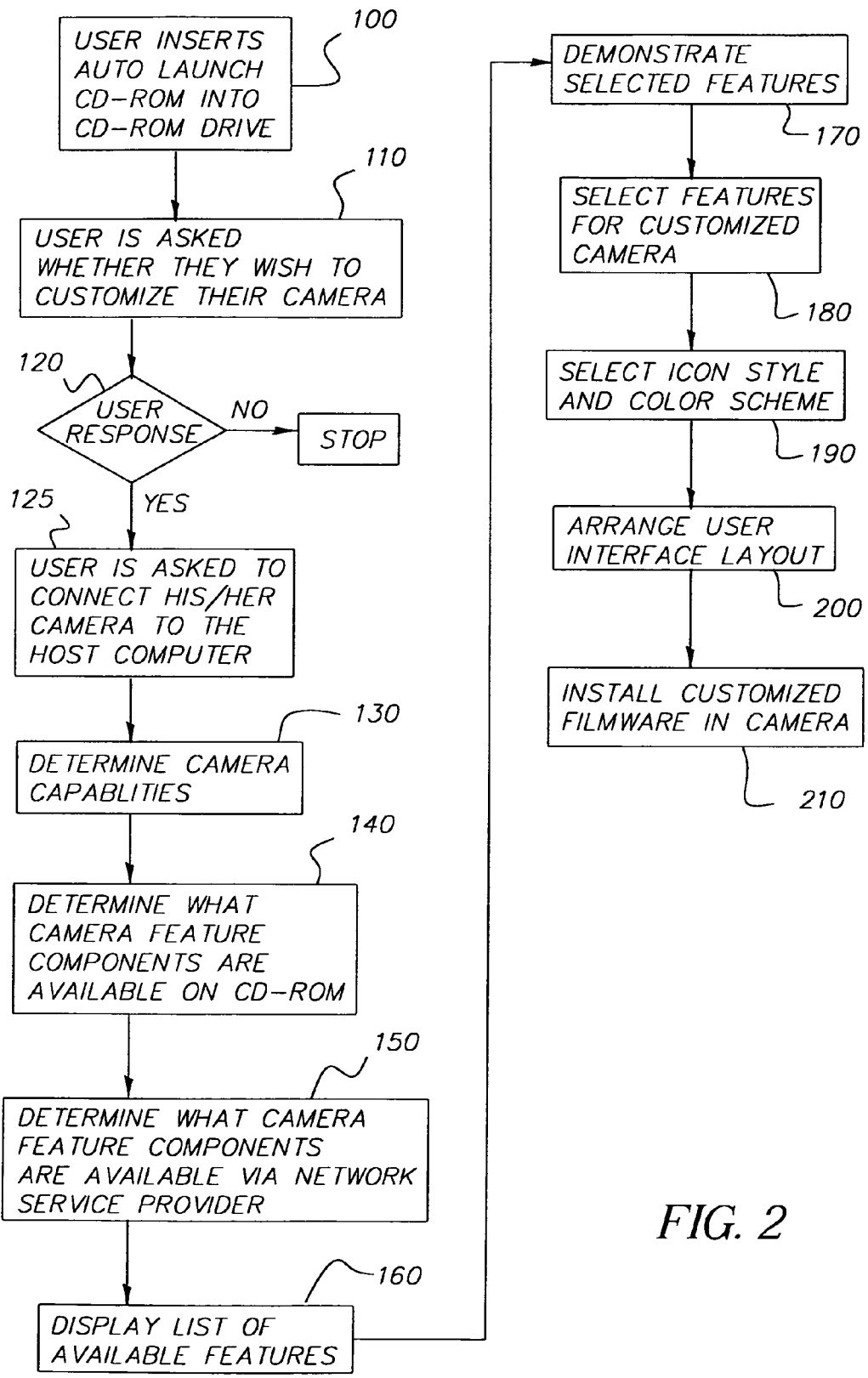
FIG. 2 is a flow diagram depicting the steps used in customizing the digital camera 10 of FIG. 1A.

FIG. 2 is a flow diagram depicting the steps used in customizing the digital camera 10 of FIG. 1 in accordance with a preferred embodiment of the present invention. As shown in FIG. 2, when the CD-ROM disc 32 provided with the digital camera 10 is inserted into the CD-ROM drive 42, the camera customization software is automatically launched (block 100) and executed by the CPU 50. The user is informed, via the display monitor 52, of the user's ability to enhance the capability of his/her newly purchased digital camera 10 and asked if the user wishes to do so at the present time (block 110). If the user responds "yes" (block 120), the user is asked to connect his/her digital camera 10 to the host computer 40 via the interface cable 36 (block 125. In block' 130, the camera customization software then determines the capabilities of the digital camera 10 and an inventory of the features currently provided by the Flash EPROM 28. The capabilities of the digital camera 10 can be determined either by determining the camera model number or by determining the types of hardware features that the digital camera 10 can support and by the size of the memory of the Flash EPROM 28.

In block 140, the camera customization software determines which feature firmware components are available for this particular model camera via the software provided on the CD-ROM disc 32. In block 150, the camera customization software uses the modem 60 to determine whether the firmware components which provide the new features not stored on the CD-ROM disc 32 are available within the camera firmware database 76 at the Network Service Provider 70. The response from the Network Service Provider 70, received by the host computer 40, might include some firmware components that are available to the user at no charge, and other firmware components for which the user will be charged. In addition, the Network Service Provider 70 can track whether the user has previously purchased firmware components so that they can be downloaded again at no charge if the firmware component was lost by the user, or is otherwise unavailable. Further, the Network Service Provider 70 could offer discounts to the user based on previous purchases.

Figure 3:
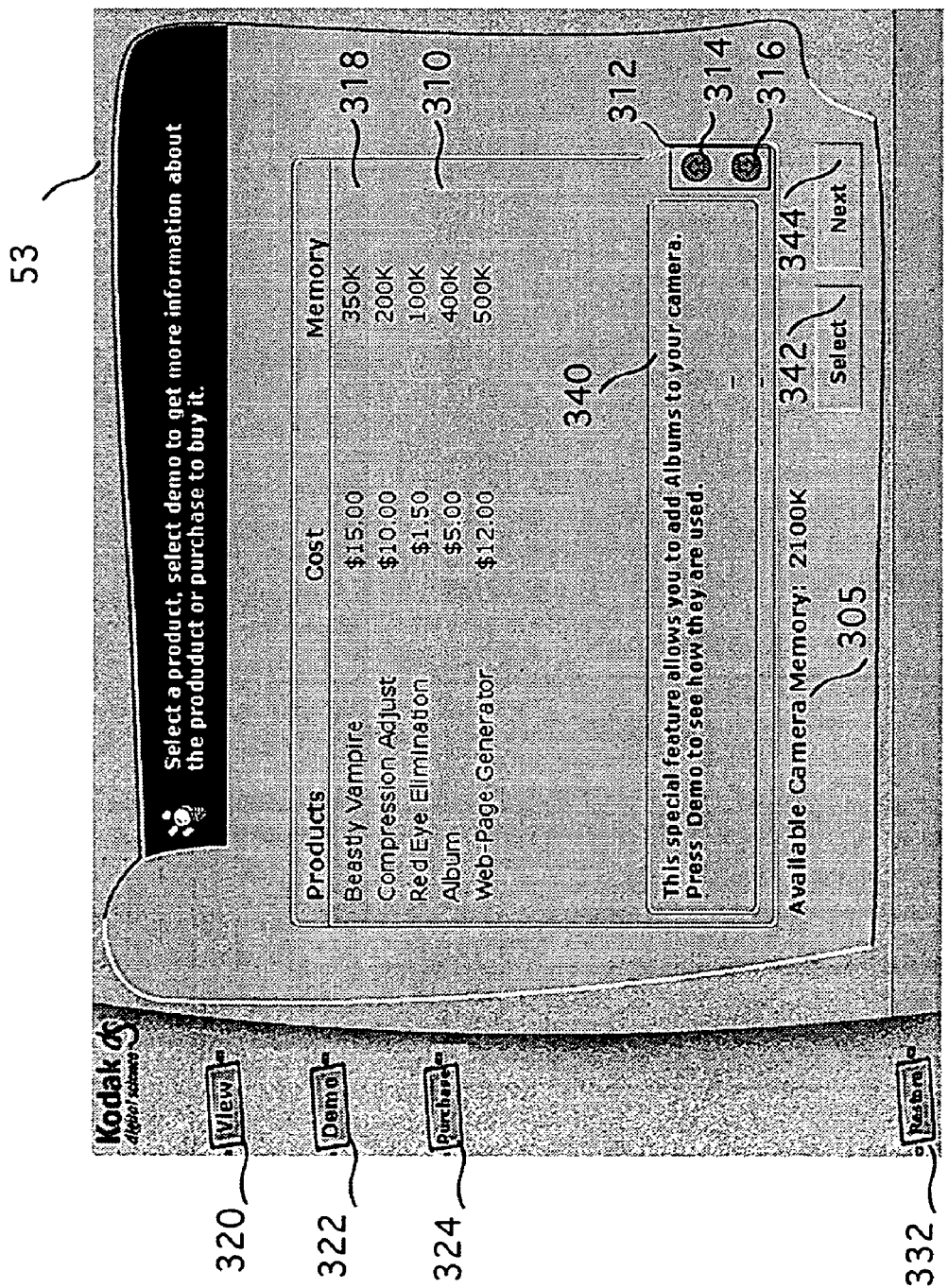
FIG. 3 illustrates a graphical screen displayed on the display monitor 52 of FIG. 1B in the process of customizing the digital camera 10 of FIG. 1A.

In block 160, the features provided by the available firmware components are displayed to the user on the display monitor 52 through an on-screen listing of these features. An example screen 53 listing available features is shown in FIG. 3. The screen 53 lists the available camera firmware memory in a window 305, and the features that the user can select in a product option window 310. A scroll bar 312 having an up arrow 314 and a down arrow 316 permits the user to scroll through a long list of available options. The product option window 310 also lists the amount of camera firmware memory needed to store the firmware component that provides the option, and the cost of the option.

To consider a particular option, the user clicks on a particular option line in the product option window 310, for example, the "Beastly Vampires" line 318, which highlights this line in the product option window 310, for example, by making the text bolder than the other lines, or changing the color of this line. A description window 340 provides a brief description of the option in this example, the option is a package of features designed for the Halloween season that includes the ability to add custom borders and special digital picture overlays with a Halloween theme. It includes two different vampire border templates, and the ability to selectively paint "blood" on pictures of faces captured by the digital camera 10. If this component is selected by the user in block 180, the appropriate firmware will be added to the Flash EPROM memory 28 of the digital camera 10 in block 210 to control the processor 18 to enable the user, via the camera user interface 24, to selectively add the vampire border templates to specific images and to paint "blood drops" in appropriate areas of the images they have captured using the digital camera 10, as the image is displayed on the color image display 22.

The product option window 310 can display many different types of optional features and functions, which will be described later. Some of these are listed in the product option window 310 shown in FIG. 3, The options include a "compression adjust" feature which provides compression algorithm settings appropriate for taking pictures of documents, rather than of real-world scenes.

The options also include a "red-eye elimination" option that eliminates red-eye pictures due to night flash. This option can be a flash add-on, meaning it adds a camera pre-flash mode to reduce the subject's pupil diameter or alternatively, can digitally process the captured picture using the processor 18 to identify and eliminate red-eye.

The options also include an "album" option that enables the user to upload, from the host computer 40 to the digital camera 10, particularly memorable personal images from various sources that are stored in the Flash EPROM memory 28, and for display on the color image display 22 or the TV display 31. These "album" images are compressed and stored as appropriate resolution images, typically having a greatly reduced number of pixels (and therefore a much smaller file size) than the images captured by the digital camera 10 and stored in the removable memory 30.

The options further include a web-page generator that automatically generates an html file using the captured images, as well as one or more of the stored album images. This feature may be customized by the user as part of the process depicted in FIG. 2 to produce a web page that has a customized background color or image, customized header text, customized image date format or titles, and customized image sizes.

In block 170 of FIG. 2, the user can select a demo of one or more features that he or she would like to see demonstrated. For example, in FIG. 3, after selecting the "Beastly Vampires" feature by clicking on line 318, the user can select the "demo" button 322. When a particular feature (e.g., the beastly vampires special package) is selected for demonstration, the demonstration software is provided from the same location which provides the corresponding firmware component (e.g., the CD-ROM 32 or Network Service Provider 70) in the form of a QuickTime movie, Macromedia director presentation, or another multi-media presentation that provides more information on the use and value of the particular feature. To return to the display depicted in FIG. 3, the user selects a "view" selector 320.

In block 180, the user selects the feature(s) that the user wants to be included in his/her digital camera 10. This is done by highlighting the desired options in the product option window 310 and then chooses a "select" selector 342. The user can start with a previous camera selection by selecting a "restore" selector 332, which permits the user to select and restore a camera feature set that was previously backed up, and use that as the starting point for a new feature set.

When one or more features must be purchased from the Network Service Provider 70, the purchaser selects a "purchase" selector 324 which provides a series of order menus (e.g., HTML web pages) generated by the Network Service Provider 70 and communicated to the computer 40 via the modem 60. The user pays for the firmware component(s) corresponding to the selected feature(s) by providing a payment identifier into a secured electronic commerce link which specifies a particular account which is to be charged or debited. The payment identifier can be a credit card number that specifies a particular credit card account. As used in this specification, a credit card will also include a debit card. The number of features that can be selected depends on the size of the firmware component(s) needed to implement the features, and the size of the firmware memory in the camera's Flash EPROM 28.

Figure 4A:
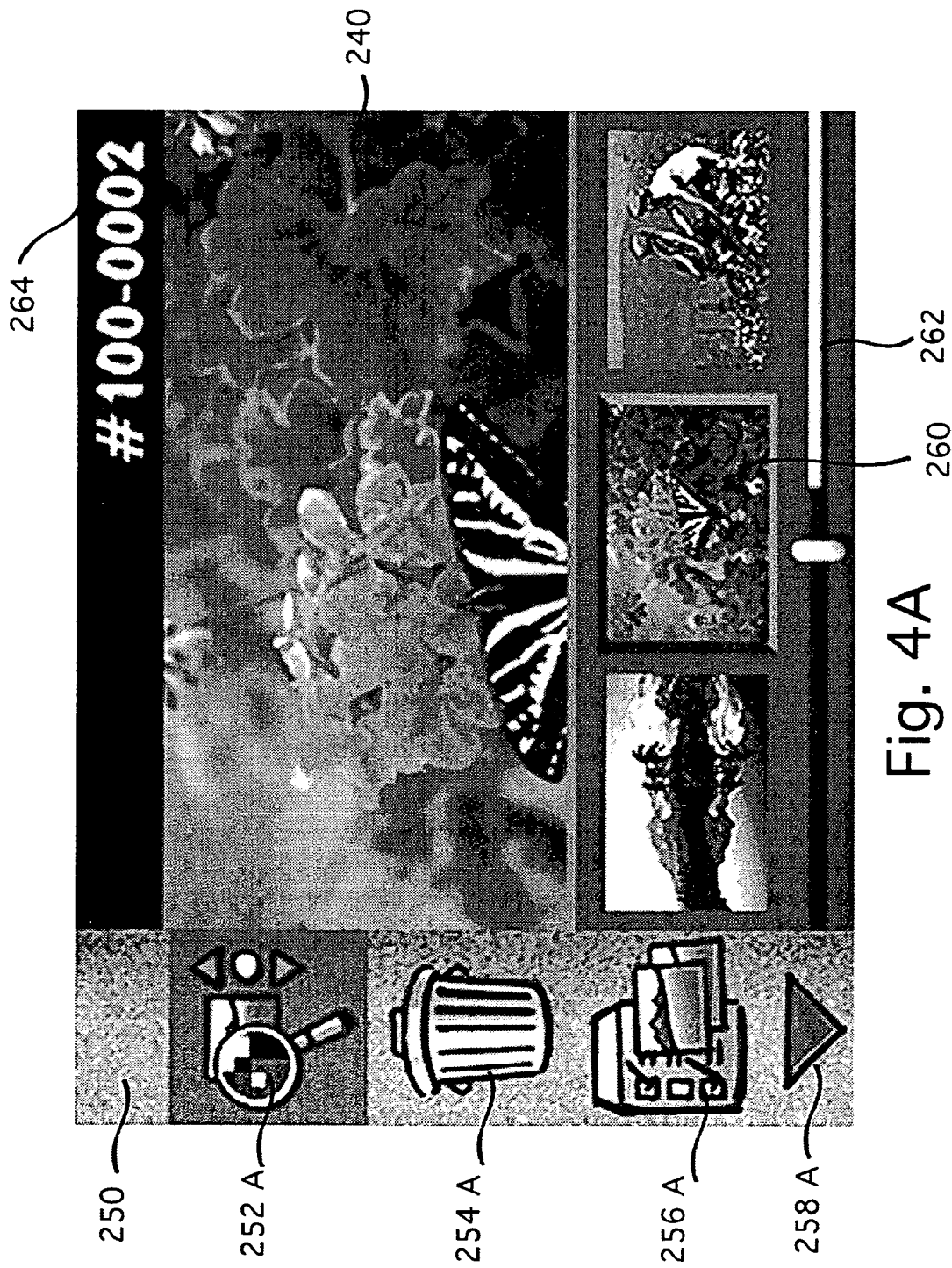
FIGS. 4A and 4B illustrate two different camera graphical user interface screens displayed on the color image display 22 of the digital camera 10 of FIG. 1A for two different users.
Figure 4B:
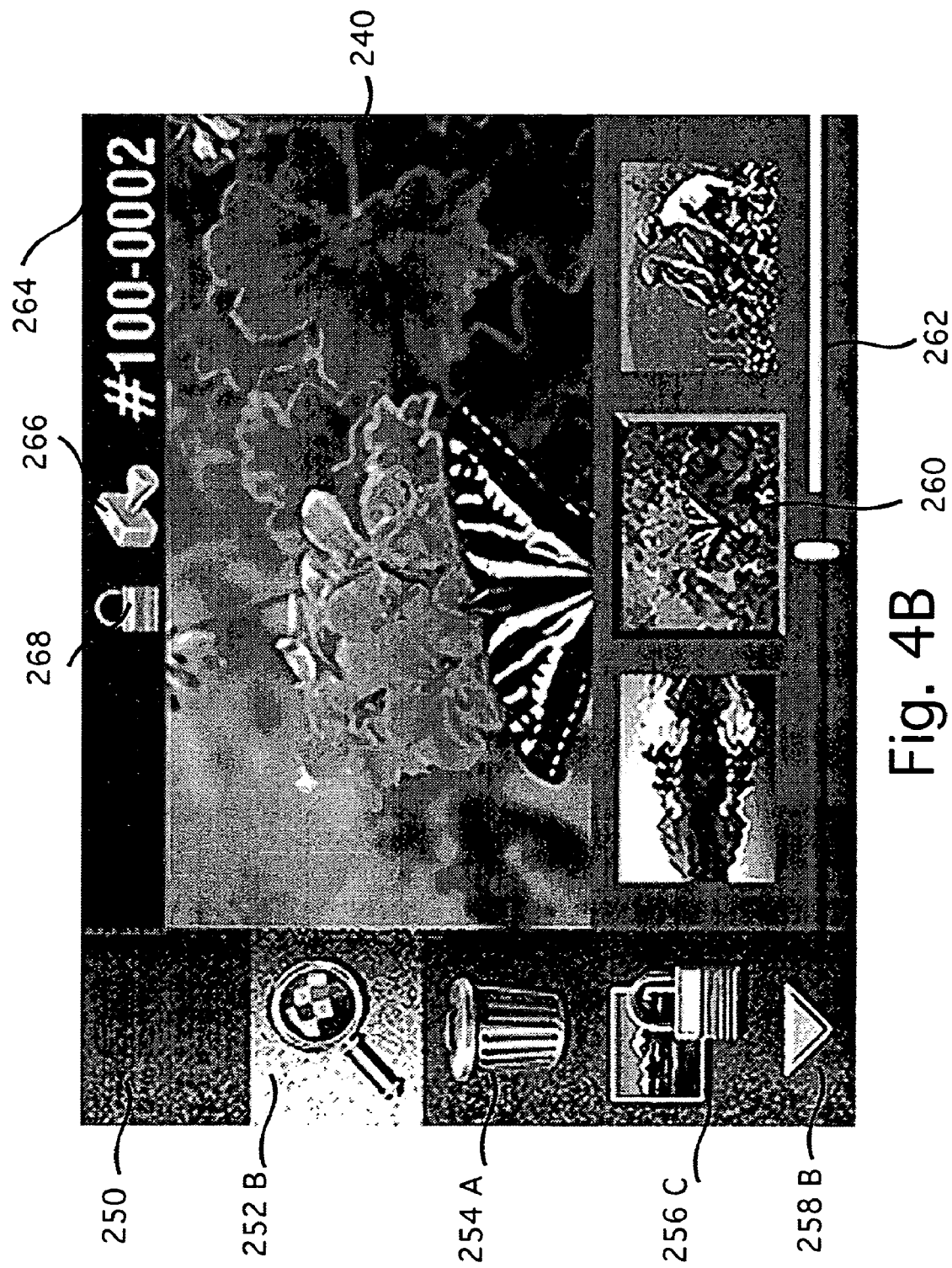
Figure 4C:
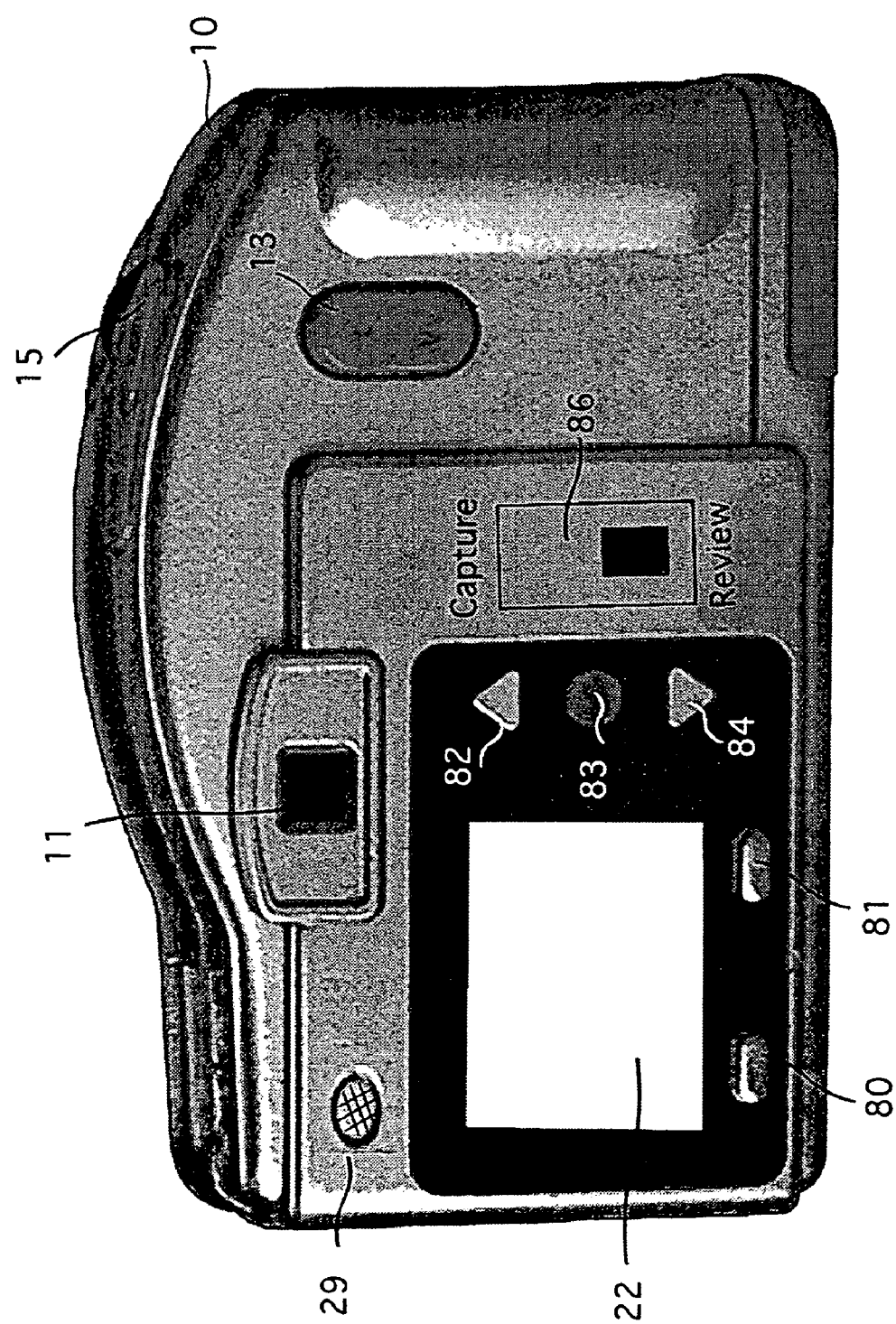
FIG. 4C is a rear view of the digital camera 10 including the color image display 22.

In block 190, the user is provided with the ability to select one of a plurality of icon schemes for the camera Graphical User Interface (GUI) 25 displayed on the color image display 22 of the digital camera 10, shown in FIG. 4C. This selection occurs after the user selects a "next" selector 344 shown in FIG. 3. Two different exemplary types of icon schemes are shown in FIGS. 4A and 4B. The icon schemes can use different colors, text fonts, icon styles (e.g., classic, whimsical, business), and background colors or patterns. The icon schemes can also include themes, such as a "Winnie the Pooh" or a "Pokemon" theme for a child, or an "X-files" or particular football team (e.g., the Green Bay Packers) theme for an adult, and the appropriate set of icons, having the appropriate text style, colors, and backgrounds will be used. Icons are provided for both the review mode features, enabled when the capture/review mode switch 86 (shown in FIG. 4C) is set in the review position, and for capture mode features, enabled when the capture/review mode switch 86 is set in the capture position.

FIGS. 4A and 4B demonstrate two different graphic user interface (GUI) screens that can be displayed on the image display 22 of the digital camera 10. Each GUI screen displays a main image 240 and provides the same basic camera functions through a scrollable list of icons 250. The first icon 252A (shown in FIG. 4A) or 252B (shown in FIG. 4B) depict different types of magnifying glasses. Selecting this icon 252A or 252B enables the user to magnify the image on the image display 22, i.e., to rescale the image to show the center portion of the image at a larger size. Both icons 252A and 252B control the same function, but have a different appearance on the image display 22 to appeal to different types of users. The second icon 254A (shown in FIG. 4A) or 254B (shown in FIG. 4B) depict different styles of trash cans which enable the user to delete the selected picture. The third icon 256A (shown in FIG. 4A) or 256B (shown in FIG. 4B) enables the user to lock the image so that it cannot be inadvertently deleted by the user. The fourth icon 258A (shown in FIG. 4A) or 258B (shown in FIG. 4B) depict different styles of arrows which enable the user to scroll down to view additional icons which provide additional functions. The ability to scroll through this list of features provides the user the ability to view either a large or small number of camera functions. The length of this list of icons is modified as additional functions are added to or taken out of the camera firmware.

A representation of a film strip 260 at the bottom of the GUI screens including three small images (i.e., thumbnails), and a memory bar 262 is shown in FIGS. 4A and 4B. These enable the user to easily scroll through and review the images that are stored on the removable memory card 30 of the digital camera 10. An image number 264 is shown in the upper right portion of each GUI screen. FIG. 4B shows two additional icons 266 and 268 at the top of the GUI screen which represent features that are enabled for the current image. In the GUI screen of FIG. 4B, the presence of icon 266 indicates that the date is overlaid on the picture and the presence of icon 268 indicates that the image is locked so that it cannot be deleted. Note that FIG. 4A does not display cons 266 and 268 to provide a less informational screen design. Because the user can select an appropriate GUI for his/her digital camera 10, the digital camera 10 displays only that information critical to the user.

In block 200 of FIG. 2, the user is provided the ability to configure the layout of the camera GUI 25 for the selected camera feature(s). Certain features, such as adding or deleting flash modes (e.g., fill flash, red-eye reduction mode, auto mode) have preferred locations in the camera GUI 25 displayed on the color image display 22. Other features, such as the ability to group images into different albums, may not have predefined places in the camera GUI 25. To configure the camera GUI 25, the CPU 50 controls the display monitor 52 to provide the display shown in FIG. 5. As the user enters this phase of the process, the user is given the option of automatically configuring these objects into the camera GUI 25 by selecting an "auto configure" selector 352, or by dragging and dropping icons to a simulation window 300 of the image display 22 of the camera GUI 25 of the desired final camera 10. This simulation window 300 includes a series of icons 362, 364, and 366 that the user can "drag and drop" in order to set their preferred icon order for the camera GUI 25 to be displayed on the color image display 22 of the digital camera 10 (shown in FIG. 1). A scroll bar 372 having an up arrow 374 and a down arrow 376 enables the user to scroll through the icons 362, 364, and 366. The user arranges the icons 362, 364 and 366 displayed in the simulation window 300 that are used for the review mode by first selecting a "review" button 380, and then arranges another set of icons (not shown) that are displayed in the simulation window 300 for the capture mode by selecting a "capture" button 382.

Figure 5:
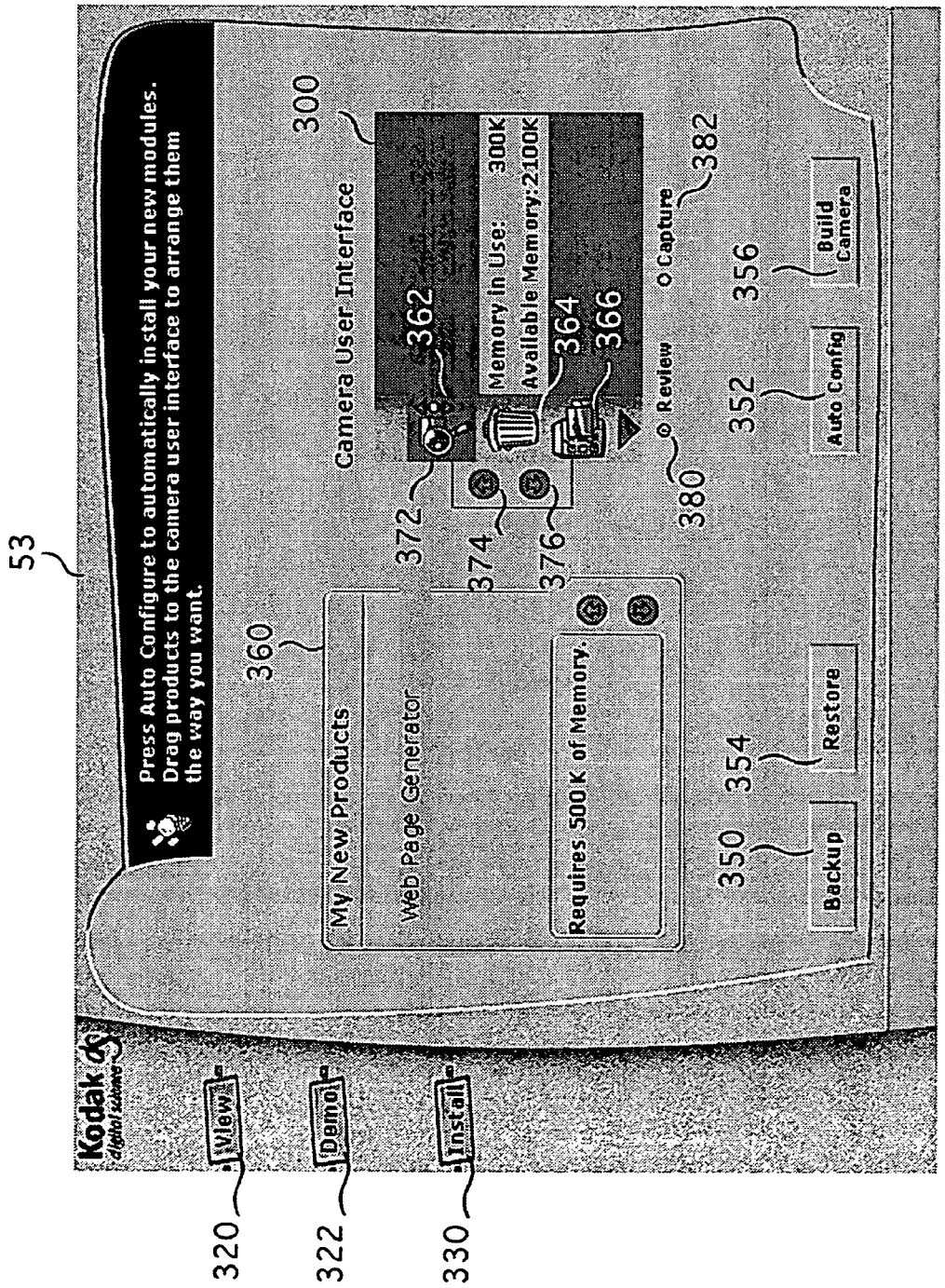
FIG. 5 illustrates an additional graphical screen displayed on the display monitor 52 of FIG. 1B in the process of customizing the digital camera 10 of FIG. 1A, which includes a depiction of the camera graphical user interface of the digital camera 10 of FIG. 1A.

Note that by selecting the "view" selector 320 shown in FIG. 5, the user can return to an earlier step in the process (e.g., block 160 of FIG. 2) if he or she wants to review other features. The user can also demo the various firmware-enabled camera options by selecting the product in a product window 360, and then selecting the "demo" selector 322. The user also has some other options. For example, the user can backup the customized camera firmware to be stored in the Flash EPROM 28 to a file on the host computer 40 by selecting a "backup" selector 350, or restore an earlier configuration from a file on the host computer 40 to override the current configuration by selecting a "restore" selector 354.

FIG. 5 also includes an "install" selector 330. In block 210 of FIG. 2, this instructs the camera customization software to configure the firmware components and upload them to the firmware stored in the Flash EPROM 28 in the digital camera 10 in order to customize the camera features and the camera user interface 24. This can be done by first erasing some of the firmware installed in Flash EPROM 28, and then uploading the new firmware components. Alternatively, the camera customization software provided on the CD-ROM 32 or the Floppy disk 34 can include camera source code that must be compiled by a firmware compiler (not shown) designed to produce firmware capable of being executed by the processor 18, before being downloaded to the digital camera 10. In this situation, the camera customization software also includes the necessary compiler software, which is executed when the user selects a "build camera" selector 356 shown on the screen 53 in FIG. 5 which is displayed on the display monitor 52 shown in FIG. 1. This enables the camera firmware to be. "built" (e.g., compiled) to create a firmware component that provides all of the user selected features. After this firmware component has been created by the compiler, the "install" selector 330 is used to initiate the downloading of the compiled firmware component to the digital camera 10. If the user is unhappy with the features provided by the newly installed firmware, the user can re-install an older firmware component by using the "restore" selector 354 followed by the "install" selector 330.

Figure 6:
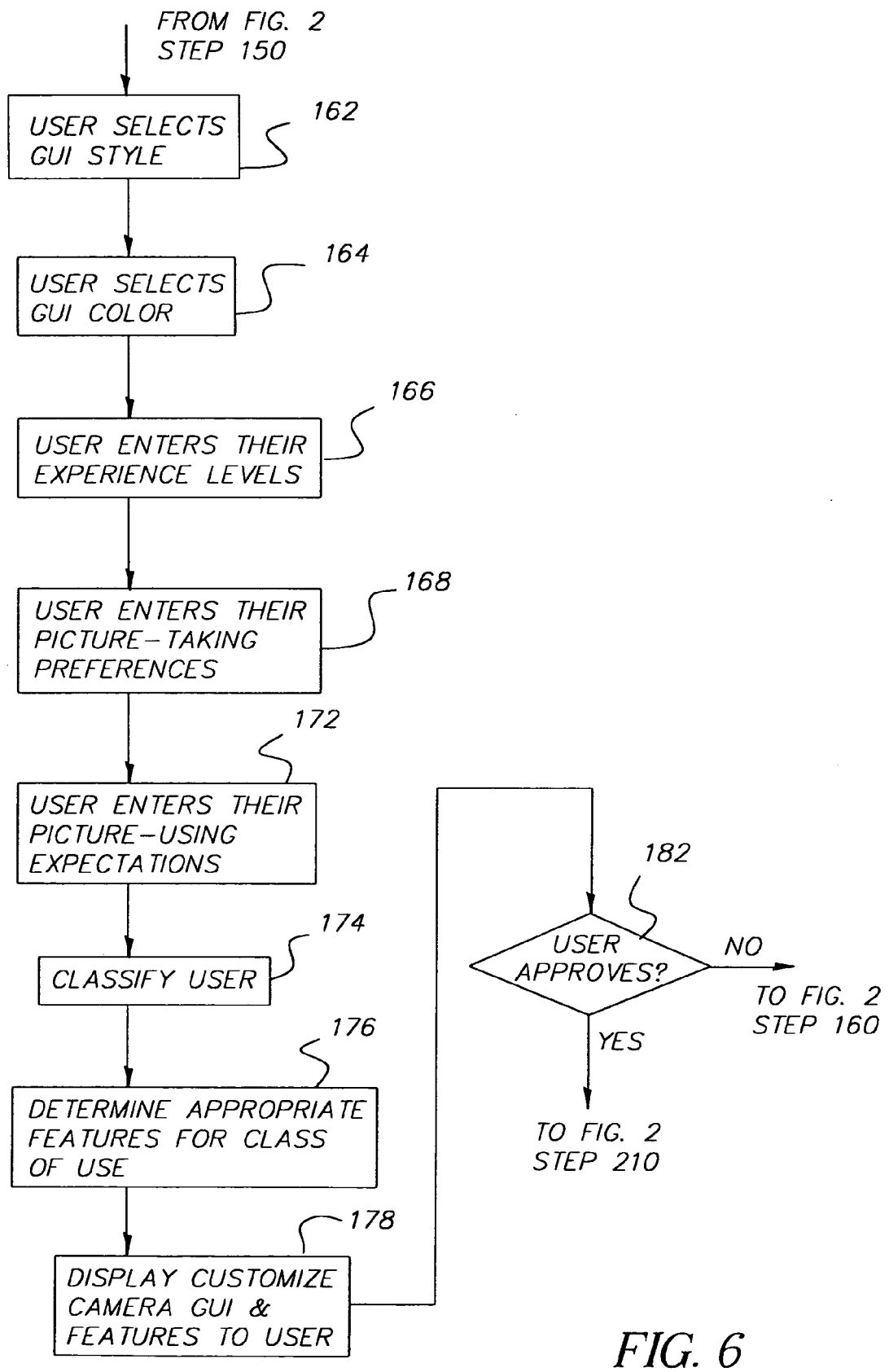
FIG. 6 illustrates an alternative embodiment of several steps of the process depicted in FIG. 2.

FIG. 6 is a flow chart depicting the steps of another embodiment of the present invention. In this embodiment, the camera customization software can, in accordance with the responses provided by the user to a series of questions provided as part of the camera customization software, selectively enable or remove various firmware from the digital camera 10, to customize the digital imaging system so that the digital camera 10 provides only those features that are of interest to the user.

Figure 7:
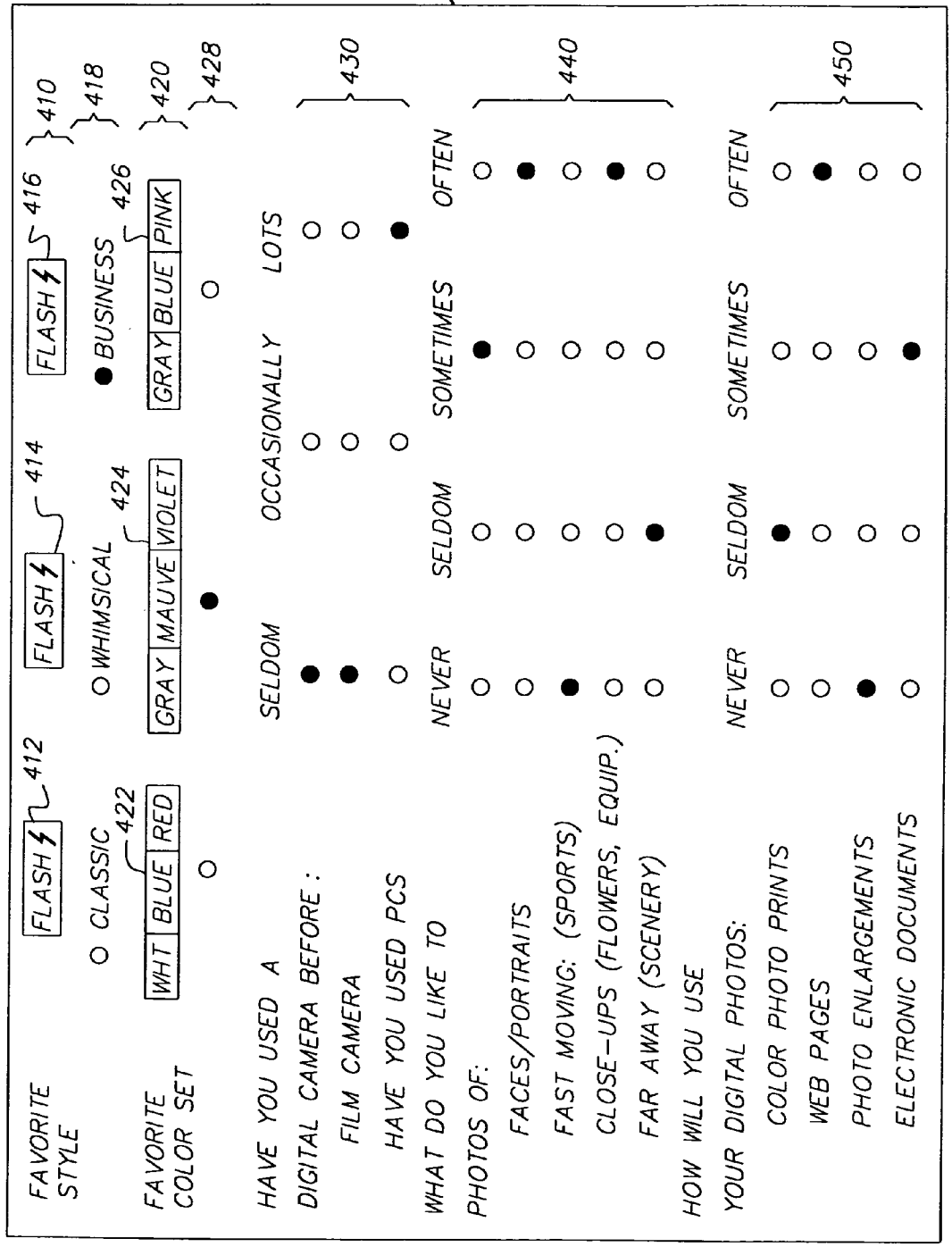
FIG. 7 depicts several graphical screens used in the process of FIG. 6.

The additional steps shown in the flow chart of FIG. 6 can be inserted between blocks 150 and 160 of the flow chart in FIG. 2, and provide an alternative to blocks 160 through 200 of FIG. 2. Block 162 in FIG. 6 follows block 150 of FIG. 2. In blocks 162 though 172 of FIG. 6, the user answers a number of questions displayed on the display monitor 52 using the keyboard 54 or the mouse 55. FIG. 7 depicts an example of an interface screen, displayed on the display monitor 52, for entering the answers to these questions using groups of "radio buttons" 418, 428, 430, 440, and 450.

In block 162 of FIG. 6, by clicking one of the radio buttons 418, the user selects a camera GUI style from a group of possible style choices 410, for example, a classic style 412, a whimsical style 414, and a business style 416 (shown in FIG. 7). In the example shown in FIG. 7, the user has selected the business style 416.

In block 164 of FIG. 6, by clicking one of the radio buttons 428, the user selects a camera GUI color set from a group of possible color sets choices 420, for example, a white/blue/red color set 422, a gray/mauve/violet color set 424, or a gray/blue/pink color set 426. In the example shown in FIG. 7, the user has selected the gray/mauve/violet color set 424.

In block 166 of FIG. 6, by clicking the appropriate radio buttons 430, the user enters his or her experience levels for using digital cameras, traditional cameras, and computers. In the example shown in FIG. 7, the user has indicated that he or she has seldom used a digital camera or film camera, but is an experienced computer user.

In block 168 of FIG. 6, by clicking the appropriate radio buttons 440, the user enters his or her picture taking preferences. This provides information on the types of pictures the user expects to take quite often, and those the user does not expect to take very often. In the example shown in FIG. 7, the user has indicated that he or she expects to "often" take portraits of faces and close-up equipment, "sometimes" take pictures of groups of people, "seldom" take pictures of faraway scenery, and never take pictures of fast-moving sports.

In block 172 of FIG. 6, by clicking the appropriate radio buttons 450, the user enters his or her expectations of how the user will use the pictures he or she plans to take with the digital camera 10. In the example shown in FIG. 7, the user has indicated that he or she expects to "often" use his or her pictures for web pages, "sometimes" use his or her pictures for electronic documents, "seldom" use his or her pictures for color photo prints, and "never" use his or her camera for photo enlargements.

In block 174 of FIG. 6, the camera customization software executed by the CPU 50 classifies the user in an appropriate category based on the user responses in blocks 162 through 172. For example, the answers provided in the example shown in FIG. 7 indicate a business user who is not familiar with photography but is very familiar with computers. Furthermore, the user is interested primarily in taking pictures of faces and close-up objects for use in creating web pages and electronic documents.

In block 176 of FIG. 6, the camera customization software executed by the CPU 50 determines the appropriate camera features for the user class determined in block 174 and creates an appropriate camera GUI 25 to enable the user to access these features. In the example shown in FIG. 7, the ability to store many relatively low resolution images in the digital camera 10, and special modes for portraits and close-up photography, would be emphasized by including the appropriate firmware components and organizing the camera GUI 25 to make these features most prominent, so they could be easily accessed by the user when using the digital camera 10. In addition, a firmware component that automatically arranges the digital pictures in a web page could be included, since the user often wishes to use his or her pictures for web pages. Camera features that are not appropriate for this class of user would not be included. For example, firmware components that provide a fast moving "sports photography" mode, or enable a direct connection between the digital camera 10 and a home printer 58 via the host interface 36, to print images without using the host computer 40, would not be included, since the user has little interest in these features.

In block 178 of FIG. 6, the customized camera GUI 25 and features are displayed to the user, for example, using the screen 53 depicted in FIG. 5, which is displayed on the display monitor 52 of FIG. 1. The screen 53 includes a simulation window 300 of the color image display 22 of the camera GUI 25 of the digital camera 10.

In block 182, the user can approve the GUI and features, for example, by selecting the "install" selector 330. In this case, block 210 of FIG. 2 is then completed in order to install the customized firmware in the digital camera 10. Alternatively, in block 182, if the user does not approve of some aspects of the GUI and features, the user can then modify the GUI or features by demonstrating and selecting alternative features, icon styles, or GUI arrangements using blocks 160 through 200 of FIG. 2.

Therefore, the process depicted in the flow chart of FIG. 6 in accordance with the present invention enables the camera customization software executed by the CPU 50 to create a customized camera GUI 25 for a particular user. The camera customization software can provide a "novice user" with a very simple set of features by "hiding" the advanced features. In addition, the camera customization software can enable the user to select the output size of the image, as well as the type of output (e.g., a web page, 4×6 inch inkjet color photo print, or an 8×12 inch thermal print photo enlargement), and have the digital camera 10 automatically select the resolution and compression settings. The camera customization software can also enable the user to select particular "photo situations" (e.g., portrait printing, web page creation), and have the digital camera 10 automatically set many camera parameters including, for example, the color matrix values and the amount of sharpening, rather than have the user deal with many complex controls.

The camera customization software executed by the CPU 50 can provide the user with the ability to select from many different features that may be provided by the firmware executed by the processor 18 in the digital camera 10. In addition to the previously described features, additional features can include:

Configuring the firmware stored in the Flash EPROM 28 in the digital camera 10 to add firmware components which provide special effects features, such as posterization or "coloring book" creative effects, monochrome or 20 sepia effects, and special effects filters (e.g., star, defocus corners);

Configuring the firmware stored in the Flash EPROM 28 in the digital camera 10 to enable the user to upload, from the host computer 40 to the digital camera 10, particularly memorable personal images for sharing with others via the color image display 22 of the digital camera 10;

Configuring the firmware stored in the Flash EPROM 28 in the digital camera 10 to add a "slide show" capability to the digital camera 10 for automatically reviewing the image on an LCD or video display, for a selected period (e.g., five seconds per image) including "transition" effects (e.g. fades or pulls) from one image to the next;

Configuring the firmware stored in the Flash EPROM 28 in the digital camera 10 to add unique sounds to the camera user interface 24, such as, for example, finny noises as pictures are taken;

Configuring the firmware stored in the Flash EPROM 28 in the digital camera 10 to support various image resolution or compression levels, compression algorithms, or image tile formats, or to provide the ability to modify captured images as they are processed, such as by digital zooming and cropping, tone or color adjustments, or sharpness adjustments;

Configuring the firmware stored in the Flash EPROM 28 in the digital camera 10 to provide red-eye removal, as described in commonly assigned U.S. Ser. No. 09/290,290, filed Apr. 13, 1999, by Fredlund, the disclosure of which is herein incorporated by reference;

Configuring the firmware components stored in the Flash EPROM 28 in the digital camera 10 to provide the ability to select one or more border templates that may be combined with newly captured digital images, as described in commonly assigned U.S. Pat. No. 5,477,264 to Sarbadhikari et al., the disclosure of which is herein incorporated by reference;

Configuring the firmware components stored in the Flash EPROM 28 in the digital camera 10 to group images into various categories or folders, as described in commonly assigned U.S. Pat. No. 5,633,678 to Kenneth Parulski, the disclosure of which is herein incorporated by reference;

Configuring the firmware components stored in the Flash EPROM 28 in the digital camera 10 to provide the ability to stitch multiple images together to produce panoramic images, such as by using the method described in commonly assigned U.S. Ser. No. 09/224,547, filed Dec. 31, 1998, by Parulski, the disclosure of which is herein incorporated by reference;

Configuring the firmware components stored in the Flash EPROM 28 in the digital camera 10 to provide print ordering from the camera, as described in commonly-assigned U.S. Ser. No. 08/977,382, filed Nov. 24, 1997, by Parulski, the disclosure of which is herein incorporated by reference;

Configuring the firmware components stored in the Flash EPROM 28 in the digital camera 10 to composite multiple images together, for example, using the method and apparatus described in commonly-assigned U.S. Pat. No. 5,914,748 to Parulski, the disclosure of which is herein incorporated by reference;

Configuring the firmware components stored in the Flash EPROM 28 in the digital camera 10 to create html files to arrange the images into 10 a web page that has a customized background color, header text, image date/titles, and image size; and Configuring the firmware components stored in the Flash EPROM 28 in the digital camera 10 to provide the ability to e-mail images from the digital camera 10, for example, as described in commonly-assigned U.S. Ser. No. 09/004,046, filed Jan. 7, 1998, by Ward, the disclosure of which is herein incorporated by reference.

Depending on the features selected, the user must provide appropriate personalization information that will later be incorporated into the customized digital camera 10. Such personalization information can include personal digital data, for example, ASCII text providing the name, mailing address, phone number, or e-mail address of the user. The personalization information can also include names of people or events to be used to categorize images, and an address book of e-mail addresses to be displayed on the color image display 22. The personalization information can also include one or more border templates selected by the user.

In an alternative embodiment, the camera customization software is uploaded to the digital camera 10 by storing the camera customization software on the removable memory card 30 using the memory card reader 48, inserting the removable memory card 30 into memory card interface 20 of the digital camera 10, and uploading the camera customization software from the removable memory card 30 to the Flash EPROM 28 as described in commonly-assigned U.S. Pat. No. 5,477,264, entitled "Electronic Imaging System Using a Removable Software-Enhanced Storage Device" to Sarbadhikari et al., the disclosure of which is herein incorporated by reference.

In another alternative embodiment, the firmware memory is provided as a Read Only Memory (ROM) that stores firmware which implements a plurality of different camera features. The digital camera 10 also includes a programmable memory (not shown) which stores camera settings. The processor 18 uses the stored camera settings to determine which camera features to implement, from the plurality of camera features provided by the firmware. In this embodiment, the camera customization software displays the selectable camera features to the user. The user selects desired features, and the camera customization software determines the associated camera setting(s). The settings are then communicated to the digital camera 10 using the host interface 36 or the removable memory card 30, and are then stored in the camera programmable memory.

In another alternative embodiment, the camera customization software provides the user with sets of digital images, for example, three images at a time, and asks the user to choose which of the three images is preferred out of each set. The images have noticeable differences in flesh tones, sharpness, contrast, and other image attributes. Based on the user's choices, the camera customization software customizes the firmware in the Flash EPROM 28 to provide the type of images preferred by the use. For example, a first user may prefer more vibrant colors, and sharper, more contrasty images. A second user may prefer softer looking images. Based on the user's selections, the edge enhancement setting, color correction matrix, and tone correction lookup tables may be modified. Alternatively, the digital camera can include a programmable memory (not shown) which stores the camera settings. For example, the programmable memory can store one or more edge enhancement settings, color correction settings and/or tone correction settings. When the user selects a preferred image, the camera customization software determines the associated camera setting(s), and the programmable memory stores the associated camera setting(s). In this embodiment, the camera customization software can be executed external to the digital camera 10 (e.g., by the CPU 50 of FIG. 1), or alternatively, can be executed by the processor 18 in the digital camera 10. In the latter case, the sets of digital images are displayed on the image display 22 of the digital camera 10 so that the camera customization process can be performed using only the digital camera 10 without the use of the host computer 40.

In another embodiment, the customization is done in a retail establishment which sells the digital camera 10. The camera firmware stored in the Flash EPROM 28 is customized at the time of purchase, either by a clerk operating a computer and selecting features at the request of the user, or by a customer-operated kiosk. In this embodiment, it is possible for the firmware to selectively limit camera features, such as by modifying the control program used for the zoom lens 12 in order to limit the zoom range (e.g., to provide only a 2:1 or a fixed focal length lens rather than the 3:1 normal zoom range) at a lower price, or to disable other features.

In another embodiment, the camera customization software permits two or more different users to customize the feature set and GUI 25 of the digital camera 10 and to store the corresponding firmware components or firmware settings in the Flash EPROM 28. When the digital camera 10 is powered on, a list 20 of users is displayed on the image display 22 and the user selects their name using the camera user interface 24. In response to this user input, the processor 18 uses the appropriate firmware components or firmware settings stored in the Flash EPROM 28 to provide the customized camera GUI and feature set for that particular user. Alternatively, when the digital camera 10 is powered on, the settings for the last user can be employed, and a camera preferences menu can be used to select a different user.

Figure 8:
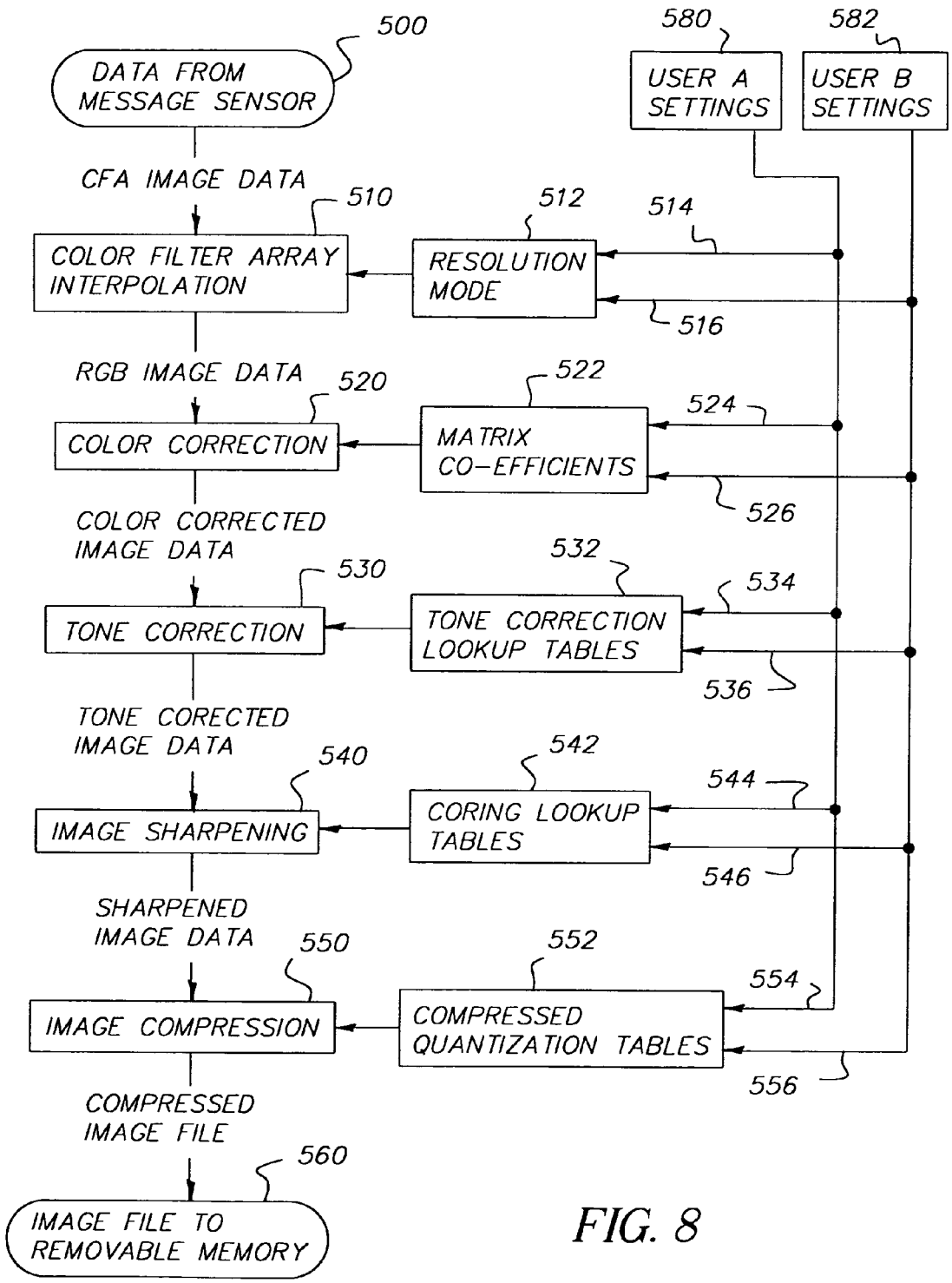
FIG. 8 is a flow diagram depicting image processing operations performed within the digital camera 10 of FIG. 1A.

FIG. 8 is a flow diagram depicting image processing operations that can be performed by the processor 18 in the digital camera 10 in order to process the images from the image sensor 14 provided by the A/D converter 16. The processing performed by the digital camera 10 to process a particular image is determined by user settings, for example, User A settings 580 or User B settings 582, shown in FIG. 8. The User A settings 580 include a resolution setting 514, a color correction setting 524, a tone correction setting 534, a sharpness setting 544, and a compression setting 554. The User B settings 582 include a resolution setting 516, a color correction setting 526, a tone correction setting 536, a sharpness setting 546, and a compression setting 556.

The Bayer pattern color filter array data (block 500) which has been digitally converted by the A/D converter 16 is interpolated in block 510 to provide red, green and blue (ROB) image data values at each pixel location. The color filter array interpolation in block 510 can use the luminance CFA interpolation method described in commonly-assigned U.S. Pat. No. 5,652,621, entitled "Adaptive color plane interpolation in single sensor color electronic camera" to Adams et. al., the disclosure of which is herein incorporated by reference. The color filter array interpolation in block 510 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

To provide multiple resolution images, for example, a full resolution image and a reduced resolution image, the color filter array 20 interpolation in block 510 can use the method described in commonly-assigned U.S. Pat. No. 5,493,335, entitled "Single sensor color camera with user selectable image record size", to Parulski et. al., the disclosure of which is herein incorporated by reference. The resolution mode provided in block 512 is either the full or reduced resolution, corresponding to the current user setting, which can be either User A resolution setting 514 or User B resolution setting 516 shown in FIG. 8.

The RGB image data is color corrected in block 520 using, for example, the 3×3 linear space color correction matrix 20 depicted in FIG. 3 of commonly-assigned U.S. Pat. No. 5,189,511, entitled "Method and apparatus for improving the color rendition of hardcopy images from electronic cameras" to Parulski et al., the disclosure of which is incorporated herein by reference. The color correction matrix coefficients which are stored in the flash EPROM 28 in the digital camera 10 can include the following:

Setting 1 (normal color reproduction)
Rout=1.50 Rin−0.30 Gin−0.20 Bin
Gout=−0.40 Rin+1.80 Gin−0.40 Bin
Bout=−0.20 Rin−0.20 Gin+1.40 Bin Setting 2 (saturated color reproduction)
Rout=2.00 Rin-0.60 Gin-0.40 Bin
Gout=−0.80 Rin+2.60 Gin−0.80 Bin
Bout=−0.40 Rin-0.40 Gin+1.80 Bin Setting 3 (desaturated color reproduction)
Rout=1.25 Rin-0.15 Gin-0.10 Bin
Gout=−0.20 Rin+1.40 Gin-0.20 Bin
Bout=−0.10 Rin-0.10 Gin+1.20 Bin Setting 4 (monochrome)
Rout=0.30 Rin+0.60 Gin+0.10 Bin
Gout=0.30 Rin+0.60 Gin+0.10 Bin
Bout=0.30 Rin+0.60 Gin+0.10 Bin The color matrix coefficients provided in block 522 include the four settings listed above. The coefficients used in color correction block 520 for a particular picture are determined by the current user setting, which can be either the User A color correction setting 524 or the User B color correction setting 526. For example, User A may have selected Setting 1 (normal color reproduction) and User B may have selected Setting 4 (monochrome). Therefore, Setting 1 is used if User A is the current user of the digital camera 10, and Setting 4 is used if User B is the current user of the digital camera 10.

Figure 9:
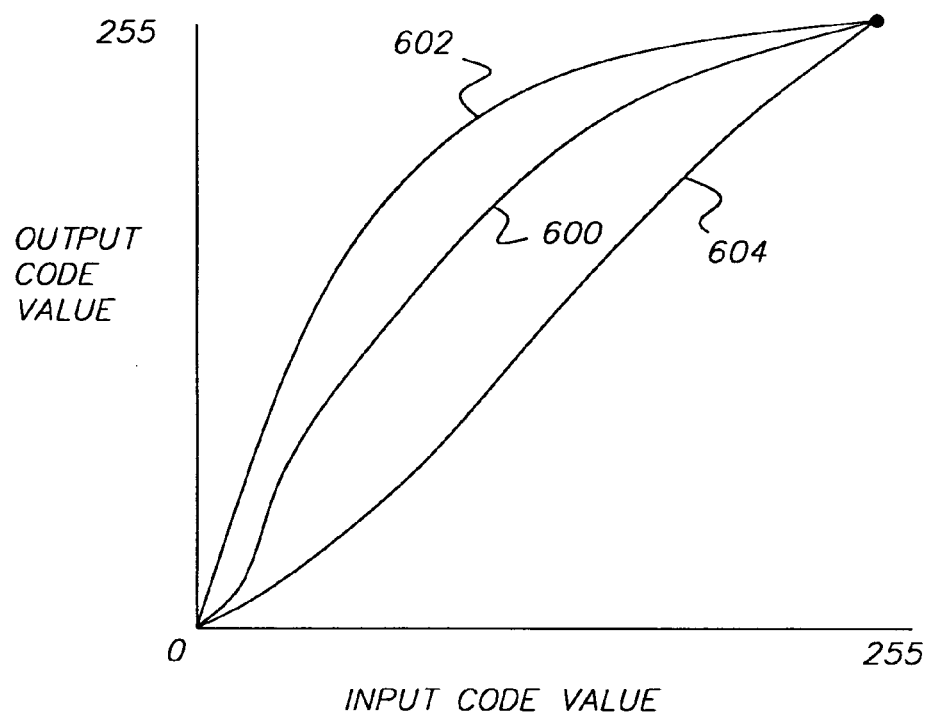
FIG. 9 depicts three tone correction curves that can be used in block 530 of FIG. 8.

The color corrected image data is tone corrected in block 530. This tone correction 530 can use, for example, the lookup table corresponding to FIG. 2 of U.S. Pat. No. 5,189,511 cited above. In the present invention, a plurality of tone correction Lookup tables is provided in block 532. These can include lookup tables corresponding to the three curves depicted in FIG. 9, which include a "normal" tone correction curve 600, a "high contrast" tone correction curve 602, and a "low contrast" tone correction curve 604. These three lookup tables are stored in the flash EPROM 28 in the digital camera 10.

The tone correction lookup table used in tone correction block 530 for a particular image is determined by the current user setting, which can be either the User A tone correction setting 534 or the User B tone correction setting 536.

The image sharpening provided in block 540 of FIG. 8 can utilize the method described in commonly-assigned U.S. Pat. No. 4,962,419 ('419 patent), entitled "Detail processing method and apparatus providing uniform processing of horizontal and vertical detail components" to Hibbard et. al., the disclosure of which is incorporated herein by reference. In the present invention, the coring lookup table depicted in FIG. 4 of the '419 patent is selected from a plurality of coring lookup tables that correspond to the curves depicted in FIG. 10. These lookup tables include a "normal" sharpening level curve 610, an "extra sharp" curve 612, and a "less sharp" curve 608. These three lookup tables are stored in the flash EPROM 28 in the digital camera 10.

Figure 10:
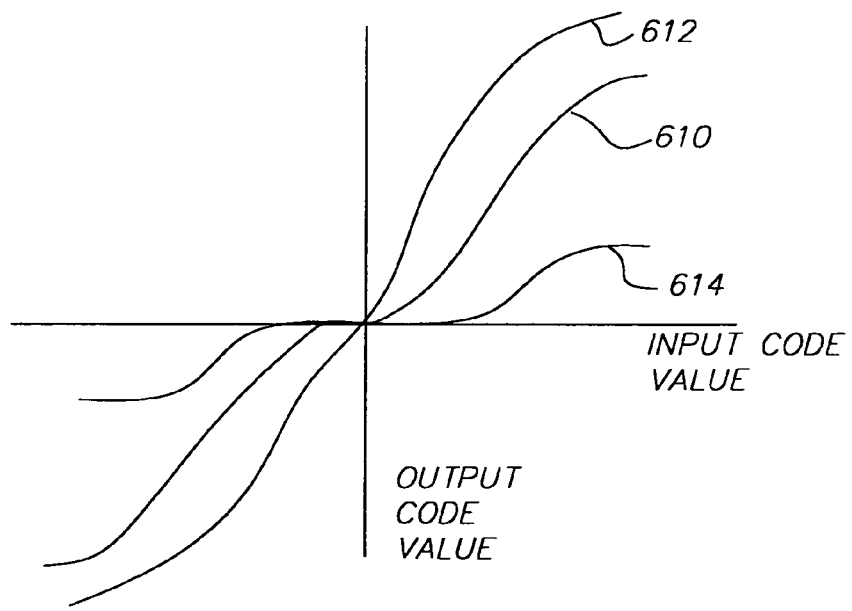
FIG. 10 depicts three Coring look-up tables that can be used in block 540 of FIG. 8.

The coring lookup tables provided in block 542 of FIG. 8 include tables corresponding to the three curves 610, 612, and 614 depicted in FIG. 10. The lookup table used in image sharpening block 540 for a particular image is determined by the current user setting, which can be either the User A sharpness setting 544 or the User B sharpness setting 546.

The image compression provided in block 550 of FIG. 8 can use the method described in commonly-assigned U.S. Pat. No. 4,774,574 (the '574 patent), entitled "Adaptive block transform image coding method and apparatus" to Daly et. al., the disclosure of which is incorporated herein by reference. The compression quantization tables provided in block 552 include a plurality of quantization tables, for example, three different tables, for the quantize block 26 in FIG. 1 of the '574 patent. These tables provide different quality levels and average file sizes for the compressed image file 560 provided to the removable memory card 30 by the digital camera 10. These three quantization tables are stored in the flash EPROM 28 in the digital camera 10.

The quantization table used in image compression block 550 of FIG. 8 for a particular image is determined by the current user setting, which can be either by the User A compression setting 554 or the User B compression setting 556 shown in FIG. 8.

The User A settings 580 and the User B settings 582 shown in FIG. 8 can be determined as part of the camera customization process depicted in FIG. 2. In this case, the settings 580 and 582 are downloaded from the host computer 40 to the digital camera 10. As described earlier, the settings 580 and 582 are used to select particular matrix coefficients (block 522), tone correction lookup tables (block 532), coring lookup tables (block 542), and compression quantization tables (block 552) stored in the flash EPROM 28 of the digital camera 10 (shown in FIG. 1). Alternatively, the matrix coefficients (block 522), tone correction lookup tables (block 532), coring lookup tables (block 542), and compression quantization tables (block 552) can be stored in a ROM (not shown), and only the camera settings 580 and 582 can be stored in a reprogrammable memory, such as the flash EPROM 28. As another alternative, only the particular matrix coefficients (block 522), tone correction lookup tables (block 532), coring lookup tables (block 542), and compression quantization tables (block 552) selected by Users A and B can be downloaded from the host computer 40 to the digital camera 10 and stored in the flash EPROM 28. As yet another alternative, the user selection can be performed using the camera GUI 25. In this embodiment, the matrix coefficients (block 522), tone correction lookup tables (block 532), coring lookup tables (block 542), and compression quantization tables (block 552) are stored in the flash EPROM 28 or in the ROM (not shown), and the user settings 580 and 582 are stored in a reprogrammable memory, such as the flash EPROM 28.

Computer program products, such as readable storage medium, can be used to store the customization software, and also the desired firmware components in accordance with the present invention. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the spirit and scope of the invention.

PARTS LIST 10 digital camera
11 optical viewfinder
12 lens
13 zoom switch
14 image sensor
15 shutter button
16 analog-to-digital converter
18 processor
20 memory card interface
22 image display
23 video output driver
24 camera user interface
25 camera graphical user interface
26 host interface
27 digital-to-analog converter
28 Flash EPROM
29 miniature speaker
30 removable memory card
31 TV display
32 CD-ROM disc
34 Floppy disk
36 interface cable
40 host computer
42 CD-ROM drive
44 Floppy disk drive
46 interface
48 memory card reader
50 central processing unit
52 display monitor
53 screen
54 keyboard
55 mouse
56 hard drive
58 home printer
60 modem 70 Network Service Provider
72 modem
74 computer
76 camera firmware database
78 billing system
80 user button
81 user button
82 user button
83 user button
84 user button
86 capture/review mode switch
240 main image
250 list of icons
252A, 252B first icon
254A, 254B second icon
256A, 256B third icon
258A, 258B fourth icon
260 filmstrip
262 memory bar
264 image number
266 icon
268 icon
300 simulation window
305 window
310 product option window
312 scroll bar
314 up arrow
316 down arrow
318 "Beastly Vampires" line
320 "view" selector
322 "demo" selector
324 "purchase" selector
330 "install" selector
332 "restore features" selector
340 description window
342 "select" selector
344 "next" selector
350 "backup" selector
352 "auto configure" selector
354 "restore" selector
356 "build camera" selector
360 product window
362 icon
364 icon
366 icon
372 scroll bar
374 up arrow
376 down arrow
380 "review" button
382 "capture" button
410 style choices
412 classic style
414 whimsical style
416 business style
418 radio button
420 color set choices
422 white/blue/red color set
424 gray/mauve/violet color set
426 gray/blue/pink color set
428 radio button
430 radio button
440 radio button
450 radio button
514 resolution setting
516 resolution setting
524 User A color correction setting
526 User B color correction setting
534 User A tone correction setting
536 User B tone correction setting
544 User A sharpness setting
546 User 13 sharpness setting
554 User A compression setting
556 User B compression setting
580 User A settings
582 User B settings
600 "normal" tone correction curve
602 "high contrast" tone correction curve
604 "low contrast" tone correction curve
608 "less sharp" curve
610 "normal" sharpening level curve
612 "extra sharp" curve

What is claimed is:

1. A method for configuring a digital camera to enable the digital camera to display digital images captured using the digital camera and digital images uploaded from a host computer, the method comprising:
(a) providing customization software executed on a host computer connected to the digital camera, wherein the customization software (i) determines the camera model number of the connected digital camera, (ii) uses the camera model number to determine at least one capability of the digital camera, and (iii) if the digital camera is capable as determined in (ii) of storing a plurality of digital images enables a user to upload the plurality of digital images from the host computer to a digital memory device in the digital camera;
(b) storing the plurality of uploaded digital images in the digital memory device in the digital camera, each uploaded digital image having a predetermined number of pixels,
(c) using the digital camera to capture a plurality of digital images and store the plurality of captured digital images in the digital memory device, each captured digital image having a number of pixels which is significantly greater than the predetermined number of pixels; and
(d) displaying, on a display of the digital camera, the captured digital images and the uploaded digital images.

2. The method of claim 1 wherein the digital memory device comprises a reprogrammable memory.

3. The method of claim 2 wherein the reprogrammable memory is Flash EPROM.

4. The method of claim 2 wherein the reprogrammable memory is a magnetic hard drive.

5. The method of claim 1 wherein the uploaded digital images are compressed digital images.

6. The method of claim 1 further comprising displaying the captured digital images and the uploaded digital images on a TV display separate from the digital camera.

7. The method of claim 1 further comprising:
providing a simulation of a graphical user interface of the digital camera on a display device of the host computer.

8. The method of claim 1 wherein the captured digital images are stored as JPEG image files.

9. The method of claim 8 wherein the digital camera provides thumbnail size image data representative of the captured digital images to the display.

10. A method for displaying on a display of a digital camera, digital images captured using the digital camera and digital images uploaded from a host computer, the method comprising:
(a) using the digital camera to capture a plurality of digital images and store the plurality of captured digital images in a digital memory device in the digital camera, each captured digital image having a first number of pixels;

(b) providing customization software executed on the host computer connected to the digital camera, wherein the customization software (i) determines the camera model number of the connected digital camera,(ii) uses the camera model number to determine at least one capability of the digital camera, and (iii) if the digital camera is capable as determined in (ii) of storing a plurality of digital images enables a user to upload the plurality of digital images from the host computer to a digital memory device in the digital camera;

(c) storing the plurality of uploaded digital images in the digital memory device in the digital camera, each uploaded digital image having a second number of pixels, the second number of pixels being significantly less than the first number of pixels; and (d) displaying, on the display of the digital camera, the captured digital images and the uploaded digital images.

11. The method of claim 10 wherein the digital memory device comprises a reprogrammable memory.

12. The method of claim 11 wherein the reprogrammable memory is Flash EPROM.

13. The method of claim 11 wherein the reprogrammable memory is a magnetic hard drive.

14. The method of claim 10 wherein the uploaded digital images are compressed digital images.

15. The method of claim 10 further comprising displaying the captured digital images and the uploaded digital images on a TV display separate from the digital camera.

16. The method of claim 10 further comprising:
providing customization software executed on the host computer to enable a user to upload digital images from the host computer to the digital camera.

17. The method of claim 16 further comprising:
providing a simulation of a graphical user interface of the digital camera on a display device of the host computer.

18. The method of claim 10 wherein the captured digital images are stored as JPEG image files.

19. The method of claim 18 wherein the digital camera provides thumbnail size image data representative of the captured digital images to the display.

* * * * *

UNITED STATES PATENT AND TRADEMARK OFFICE
CERTIFICATE OF CORRECTION

| | |
|---|---|
| PATENT NO. | : 7,408,582 B2 |
| APPLICATION NO. | : 10/850145 |
| DATED | : August 5, 2008 |
| INVENTOR(S) | : Girish V. Prabhu et al. |

Page 1 of 1

It is certified that error appears in the above-identified patent and that said Letters Patent is hereby corrected as shown below:

Title Page Col. 1, (54) Title, line 2     Delete "DISPLAY" and insert --DISPLAYING--, therefor.

Page 2, Col. 1, line 2, Title     Delete "DISPLAY" and insert --DISPLAYING--, therefor.

Col. 19, Claim 10, line 4     Delete "camera,(ii)" and insert --camera, (ii)--, therefor.

Signed and Sealed this

Twenty-eighth Day of July, 2009

JOHN DOLL
*Acting Director of the United States Patent and Trademark Office*